US008538810B2

(12) United States Patent
Fox (10) Patent No.: US 8,538,810 B2
(45) Date of Patent: Sep. 17, 2013

(54) METHODS AND SYSTEMS FOR MEMBER-CREATED ADVERTISEMENT IN A MEMBER NETWORK

(75) Inventor: Kevin David Fox, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1371 days.

(21) Appl. No.: 11/093,949

(22) Filed: Mar. 29, 2005

(65) Prior Publication Data

US 2006/0224446 A1 Oct. 5, 2006

(51) Int. Cl.
*G06Q 30/00* (2012.01)

(52) U.S. Cl.
USPC ...................................................... 705/14.49

(58) Field of Classification Search
USPC .............. 705/14, 26, 78, 27, 14.49; 709/225, 709/224, 223; 370/389; 725/36
See application file for complete search history.

(56) References Cited

U.S. PATENT DOCUMENTS

| | | | |
|---|---|---|---|
| 5,796,393 A | 8/1998 | MacNaughton et al. | |
| 6,041,311 A | 3/2000 | Chislenko et al. | |
| 6,073,138 A | 6/2000 | de l'Etraz et al. | |
| 6,092,049 A | 7/2000 | Chislenko et al. | |
| 6,130,938 A | 10/2000 | Erb | |
| 6,192,119 B1 | 2/2001 | Wilson | |
| 6,421,678 B2 | 7/2002 | Smiga et al. | |
| 6,442,567 B1 | 8/2002 | Retallick et al. | |
| 6,594,673 B1 | 7/2003 | Smith et al. | |
| 6,658,423 B1 | 12/2003 | Pugh et al. | |
| 6,697,478 B1 | 2/2004 | Meldrum et al. | |
| 6,754,322 B1 | 6/2004 | Bushnell | |
| 6,799,176 B1 | 9/2004 | Page | |
| 6,834,195 B2 | 12/2004 | Brandenberg et al. | |
| 6,895,406 B2 | 5/2005 | Fables et al. | |
| 6,912,505 B2 | 6/2005 | Linden et al. | |
| 7,069,308 B2 | 6/2006 | Abrams | |
| 7,080,117 B2 | 7/2006 | De Pinto et al. | |
| 7,092,821 B2 | 8/2006 | Mizrahi et al. | |
| 7,106,848 B1 | 9/2006 | Barlow et al. | |
| 7,113,917 B2 | 9/2006 | Jacobi et al. | |
| 7,117,254 B2 | 10/2006 | Lunt et al. | |
| 7,118,153 B2 | 10/2006 | Lunt | |
| 7,139,252 B2 | 11/2006 | Babu et al. | |
| 7,234,117 B2 | 6/2007 | Zaner | |
| 7,269,590 B2 | 9/2007 | Hull | |

(Continued)

FOREIGN PATENT DOCUMENTS

| | | | |
|---|---|---|---|
| CN | 1949220 A | 4/2007 | |
| EP | 1164767 A2 | 12/2001 | |

(Continued)

OTHER PUBLICATIONS

PCT International Search Report and Written Opinion, International Patent Application No. PCT/US06/09385, Aug. 23, 2007.

(Continued)

*Primary Examiner* — Matthew L Hamilton
(74) *Attorney, Agent, or Firm* — Patent Law Works LLP (57) ABSTRACT

Methods and systems for members of a member network to create and target advertisement to other members of the member network. A member can target advertisement to other members in the member network by establishing a member profile that includes associations and/or nexuses with the targeted members. Fees can be charged to members who create and disseminate advertisement to other members in the member network.

31 Claims, 6 Drawing Sheets

(56) References Cited

U.S. PATENT DOCUMENTS

| | | | |
|---|---|---|---|
| 7,275,068 B2 | 9/2007 | Huberman et al. | |
| 7,343,335 B1 | 3/2008 | Olliphant | |
| 7,366,990 B2 | 4/2008 | Pitroda | |
| 7,454,464 B2 | 11/2008 | Puthenkulam | |
| 7,478,078 B2* | 1/2009 | Lunt et al. | 707/1 |
| 7,555,110 B2 | 6/2009 | Dolan et al. | |
| 7,610,287 B1 | 10/2009 | Dean et al. | |
| 7,665,107 B2* | 2/2010 | Goodman et al. | 725/34 |
| 7,742,468 B2 | 6/2010 | Vagelos | |
| 2002/0010626 A1 | 1/2002 | Agmoni | |
| 2002/0036654 A1* | 3/2002 | Evans et al. | 345/744 |
| 2002/0046099 A1* | 4/2002 | Frengut et al. | 705/14 |
| 2002/0059130 A1 | 5/2002 | Cheng et al. | |
| 2002/0059201 A1 | 5/2002 | Work | |
| 2002/0069105 A1* | 6/2002 | do Rosario Botelho et al. | 705/14 |
| 2002/0087402 A1* | 7/2002 | Zustak et al. | 705/14 |
| 2002/0103682 A1 | 8/2002 | Stemmer | |
| 2002/0116466 A1 | 8/2002 | Trevithick | |
| 2002/0120505 A1 | 8/2002 | Henkin | |
| 2002/0124053 A1 | 9/2002 | Adams et al. | |
| 2002/0137490 A1 | 9/2002 | Gallant | |
| 2002/0143874 A1 | 10/2002 | Marquette et al. | |
| 2002/0143944 A1* | 10/2002 | Traversat et al. | 709/225 |
| 2002/0178164 A1 | 11/2002 | Wisniewski | |
| 2003/0020977 A1 | 1/2003 | Smith et al. | |
| 2003/0078858 A1* | 4/2003 | Angelopoulos et al. | 705/26 |
| 2003/0083898 A1 | 5/2003 | Wick | |
| 2003/0083937 A1 | 5/2003 | Hasegawa et al. | |
| 2003/0163530 A1 | 8/2003 | Ribak | |
| 2004/0088325 A1 | 5/2004 | Elder | |
| 2004/0122681 A1 | 6/2004 | Ruvolo et al. | |
| 2004/0122803 A1 | 6/2004 | Dom | |
| 2004/0162830 A1 | 8/2004 | Shirwadkar | |
| 2004/0172328 A1 | 9/2004 | Fukui | |
| 2004/0193684 A1 | 9/2004 | Yoseph | |
| 2004/0204997 A1 | 10/2004 | Blaser et al. | |
| 2004/0215793 A1* | 10/2004 | Ryan et al. | 709/229 |
| 2004/0221309 A1 | 11/2004 | Zaner | |
| 2004/0258220 A1 | 12/2004 | Levine et al. | |
| 2005/0033641 A1 | 2/2005 | Jha et al. | |
| 2005/0050158 A1 | 3/2005 | Solari | |
| 2005/0071741 A1 | 3/2005 | Acharya et al. | |
| 2005/0102177 A1* | 5/2005 | Takayama | 705/14 |
| 2005/0152521 A1 | 7/2005 | Liljestrand | |
| 2005/0159998 A1 | 7/2005 | Buyukkokten et al. | |
| 2005/0165638 A1* | 7/2005 | Piller | 705/14 |
| 2005/0165785 A1 | 7/2005 | Malkin et al. | |
| 2005/0171832 A1 | 8/2005 | Hull et al. | |
| 2005/0197846 A1 | 9/2005 | Pezaris et al. | |
| 2005/0198031 A1 | 9/2005 | Pezaris et al. | |
| 2005/0209999 A1 | 9/2005 | Jou | |
| 2005/0210409 A1 | 9/2005 | Jou | |
| 2005/0216300 A1 | 9/2005 | Appelman et al. | |
| 2005/0246420 A1 | 11/2005 | Little | |
| 2005/0267766 A1 | 12/2005 | Galbreath et al. | |
| 2005/0267940 A1 | 12/2005 | Galbreath et al. | |
| 2006/0026288 A1 | 2/2006 | Acharya et al. | |
| 2006/0077957 A1 | 4/2006 | Reddy et al. | |
| 2006/0085259 A1 | 4/2006 | Nicholas | |
| 2006/0136419 A1 | 6/2006 | Brydon et al. | |
| 2006/0184997 A1 | 8/2006 | La Rotonda et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0133716 A1 | 6/2008 | Rao et al. | |
| 2008/0192656 A1 | 8/2008 | Vagelos | |
| 2009/0013386 A1 | 1/2009 | Puthenkulam | |
| 2009/0158355 A1* | 6/2009 | Rodriguez et al. | 725/60 |
| 2011/0098156 A1 | 4/2011 | Ng et al. | |
| 2011/0113113 A1* | 5/2011 | Ryan et al. | 709/206 |
| 2011/0289574 A1* | 11/2011 | Hull et al. | 726/7 |
| 2012/0310747 A1* | 12/2012 | Calabria | 705/14.67 |

FOREIGN PATENT DOCUMENTS

| | | |
|---|---|---|
| JP | 11265369 A | 9/1999 |
| JP | 2002132604 A | 5/2002 |
| WO | WO0279984 | 10/2002 |

OTHER PUBLICATIONS

Supplementary European Search Report for European Patent Application No. EP 06738448, Jun. 7, 2010, 7 Pages.

Doctorow, C., "Running Notes from Revenge of the User," Revenge of the User: Lessons from Creator/User Battles at the O'Reilly Emerging Technology Conference, Feb. 11, 2004, 5 pages, [online] Retrieved on Jul. 28, 2004] Retrieved from the internet <URL:http://craphound.com/danahetcon04.txt>.

Harper, P., "Is Friendster the 'Next Big Thing'? Why millions are jumping on this online bandwagon," Social networking in the digital age, MSN, 2004, 2 pages.

"PlanetAll," From Internet Archive Wayback Machine on Nov. 1997, 19 pages, [online] [Retrieved on Mar. 17, 2004] Retrieved from the internet <URL: Internet Archive Wayback Machine: www.archive.org/www/planetall.com>.

NomadNet, "NomadNet News," web page at <URL:http://www.netnomad.com/> available via the Internet and printed Dec. 1, 2004, 12 pages.

Ofoto, "Ofoto Share Albums," web page at <URL:http://www.ofoto.com/ShareOverview.jsp?UV=363085663086_78428514107> as available via the Internet and printed Dec. 1, 2004, 2 pages.

Online Business Network, "Social Networking Site Guide-Ryze," web page at <URL:http://www.onlinebusinessnetworks.comlonline-social-networks-guide/ryze>, as available via the Internet and printed Dec. 1, 2004, 8 pages.

PC World, "PCWorld-ICQ Builds a Social Network," web page at <URL:http://www.pcworld.com/news/articleIO.aid.115084.OO.asp>, as available via the Internet and printed Dec. 1, 2004, 5 pages.

Petersen's Photographic, "My Photos at Photographic," web page at <URL:http://rnyphotos.photographic.com/>, as available via the Internet and printed Dec. 1, 2004, 19 pages.

PictureDot, "CactusVision WebCam from PictureDot.com-Broadcast your live webcam now, Free!" web page at <URL:http://www.picturedot.com?CactusVision_WebCam_Info.asp>, as available via the Internet and printed Dec. 1, 2004, 2 pages.

SAE International, "Why should I register to use the SAE website?" web page at <URL:http:my.sae.org/whyregister.htm>, as available via the Internet and printed Dec. 1, 2004, 1 page.

Theme your Desktop, "Free Webcam Thumbnails on your Desktop-ANY webcam.com," web page At <URL:http://themes.anywebcam.comJdesktop/desktop.html> as available via the Internet and printed Dec. 1, 2004, 3 pages.

Westlaw, "WestClip", 2004, web page at <URL:http://west.thomson.com/westlaw/westclip/>, as available via the Internet and printed Jul. 28, 2004, 3 pages.

Yahoo!, "Introducing RSS Headlines," web page at <URL:http://e.my.yahoo.com/config/promo content?.module=ycontent>, as available via the Internet and printed Jun. 18, 2004, 1 page.

Yahoo!, "Yahoo! Chat," web page at <URL:http://chat.yahoo.com/>, as available via the Internet and printed Dec. 1, 2004, 1 page.

Yahoo!, "Yahoo! Help-Yahoo! GeoCities Tour," web page at <URL:http://help.yahoo.com/help/us/geo/tour/tour-01.html>, as available via the Internet and printed Dec. 1, 2004, 20 pages.

Yahoo! Groups, "Customize LostDrive-ln," web page at <URL:http://groups.yahoo.com/groups/lostdrive/in/confwiz>, as available via the Internet and printed Jun. 2, 2004, 10 pages.

First Examination Report for India Patent Application No. 1710/MUMNP/2007, Nov. 3, 2010, 2 pages.

Lance, G.N., et al., "Computer programs for hierarchical polythetic classification ("similarity analyses")," The Computer Journal, C.S.I.R.O. Computing Research Section, 1966, p. 60-64, vol. 9.

Lance, G.N., et al., "A Generalized Sorting Strategy for Computer Classifications," Nature, Oct. 8, 1966, p. 218, vol. 212.

Lance, G.N., et al., "A General Theory of Classificatory Sorting Strategies 1. Hierarchical Systems," The Computer Journal, C.S.I.R.O. Computing Research Section, 1967, pp. 373-380, vol. 9, No. 4.
Lance, G.N., et al., "Mixed-data classificatory programs. I. Agglomerative Systems," Austral. Comput. J., 1967, pp. 15-20, vol. 1.
Milligan, G., "Ultrametric Hierarchical Clustering Algorithms," Psychometrika, Sep. 1979, pp. 343-346, vol. 44, No. 3.
Tan, P.N., et al., "Introduction to Data Mining," Chapter 8 Cluster Analysis: Basic Concepts and Algorithms (Section 8.3.3—The Lance-Williams Formula for Cluster Proximity, pg. 524), 2006, pp. 487-568.
Google, Inc., "Google Answers," Google, 2004, 1 page, [online] [retrieved on Jul. 29, 2004] retrieved from the internet <URL:http://answers.google.com/answers/>.
Google, Inc., "Google Answers: Frequently Asked Questions," Google, 2003, 9 pages, [online] [retrieved on Jul. 29, 2004] retrieved from the internet <URL:http://answers.google.com/answers/faq.html>.
Yahoo! Inc., "Yahoo! Groups," Yahoo! Inc., 2004, 2 pages, [online] [retrieved on Jul. 29, 2004] retrieved from the internet <URL:http://groups.yahoo.com>.
Yahoo! Inc., "Yahoo! Help—Groups," Yahoo! Inc., 2004, 12 pages, [online] [retrieved on Jul. 29, 2004] retrieved from the internet <URL:http://help.yahoo.com/help/us/groups/groups-01.html>.
Yahoo! Inc., "Yahoo! Help—Groups Database," Yahoo! Inc., 2004, 9 pages, [online] [retrieved on Jul. 29, 2004] retrieved from the internet <URL:http://help.yahoo.com/help/us/groups/database>.
AT&T Personal Reach Service: Benefits and Features, Mar. 29, 2010, 7 pgs.
AT&T Personal Reach Service: Personal Reach Service, Mar. 29, 2010, 2 pgs.
International Search Report, International Application No. PCT/US2008/005118, Sep. 30, 2008, 2 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, pp. 1-83.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Adamic, L., et al., "A social network caught in the Web", First Monday, 2003, pp. 1-22.
Agarwal, P. et al., "Enabling Real-Time User Interests for Next Generation Activity-Oriented Social Networks", A Thesis submitted to the Indian Institute degree of Technology Delhi in conformity with the requirements for the Bachelor of Technology, 2005, 70 pages.
Anwar, Z., et al., "Leveraging 'Social-Network' Infrastructure to Improve Peer-to-Peer Overlay Performance: Results from Orkut", 2005, 9 pages.
Baird, D., et al., "Neomillennial user design strategies: utilizing social networking media to support "Always on" Learning Styles," J. Educational Technology Systems, vol. 34(1) 5-32, 2005-2006.
Boyd, D., et al., "Social Network Sites: Definition, History, and Scholarship", Journal of Computer-Mediated Communication 13 (2008) 210-230.
Churchill, E., et al., "Social Networks and Social Networking", IEEE Internet Computing, Published by the IEEE Computer Society, Sep Oct. 2005, pp. 14-19.
Cohen, T., et al., "Social Networks for Creative Collaboration", C&C'05, Apr. 12-15, 2005, ACM, pp. 252-255.
Decker, S. et al., "The Social Semantic Desktop", DERI Technical Report May 5, 2004, May 2004, 7 pages.
Eagle, N., et al., "Social Serendipity: Proximity Sensing and Cueing", MIT Media Laboratory Technical Note 580, May 2004, 18 pages.
Erickson, T., et al., "Social Translucence: Using Minimalist Visualizations of Social Activity to Support Collective Interaction", In Designing Information Spaces: The Social Navigation Approach (eds. K. Hook, D. Benyon, a Munroe), Springer-Verla: London, 2003, pp. 17-41.
Gross, R., et al., "Information Revel tion and Privacy in Online Social Networks", WPES'05, Nov. 7, 2005, ACM, pp. 71-80.
Hammond, T., et al., "Social Bookmarking Tools (I)", D-Lib Magazine, Apr. 2005, 23 pp., vol. 11, No. 4.
Heer, J., et al., "Vizster: Visualizing Online Social Networks", IEEE Symposium on Information Visualization, 2005, 8 pages.
Leonard, A., "You are who you know", published on www.salon.com, Jun. 15, 2004, 15 pages.
Lockheed-Martin Corporation "Battl-field awareness and data dissemination intelligent information dissemination server," AFRL-IF-RS-TR-1999-238, Final Technical Report, Nov. 1999, 31 pages.
Marwick, A.E., "Selling Your Self: Online Identity in the Age of a Commodified Internet", A thesis submitted in partial fulfillment of the requirement for the degree of Master of Arts University of Washington, 2005, 192 pages.
Metcalf, S., et al., "Spatial Dynamics of Social Network Evolution", Presented at the 23rd International Conference of the System Dynamics Society, Jul. 19, 2005, 13 pages.
Mori, J., et al., "Real-world Oriented Information Sharing Using Social Networks", GROUP'05, Nov. 6-9, 2005, ACM, pp. 81-84.
Nardi, B., et al., "Blogging as Social Activity, or, Would You Let 900 Million People Read Your Diary?" CSCW, Nov. 6-10, 2004, ACM pp. 222-231, vol. 6, Issue 3.
Neumann, M., et al., "Semantic social network protal for collaborative online communites", Journal of European Industrial Training, vol. 29 No. 6, 2005 pp. 472-487.
O'Murchu, I., et al., "Online Social and Business Networking Communities", DERI—Digital Enterprise Research Institute, DERI Technical Report Aug. 11, 2004, Aug. 2004, 22 pages.
Steen, M., et al., "Development of web-centric, context-aware, adaptive mobile services requires empathy and dialogue", Freeband FRUX, 2005, pp. 1-4.
Van Eijk, R., et al., "We-centric, context-aware, adaptive mobile service bundles", Telematica Instituut, Nov. 30, 2004, 48 pages, published on Freeband.
Wenger, E., et al., "Technology for communities", CEFRIO Book Chapter v 5.2, Jan 18, 2005, pp. 1-15.
Livejournal syndicated accounts (2004), last updated Jan. 6, 2004, can be retrieved at <URL:http://www.livejournal.com/syn/>, 2 pages.

* cited by examiner

METHODS AND SYSTEMS FOR MEMBER-CREATED ADVERTISEMENT IN A MEMBER NETWORK

BACKGROUND OF THE INVENTION

1. Field of the Invention

The present invention relates generally to methods and systems for advertising. For example, embodiments of the present invention relate generally to methods and systems for members in a member network to create and disseminate advertisement to other members in the network.

2. Background

Online advertising and search engines are ubiquitous on the Internet and World Wide Web. Online advertising in such forms as banner advertisement and pop-up advertisement include links that implore viewers to click on the advertisement and be directed to a linked website for further information on the advertised products or services. The relative ease with which online advertising can be done and the large audience available on Internet have spawned advertisement spamming. As consequences, Internet users are turned away by the constant bombardment of advertisement, and the advertisement become less effective in attracting an audience to advertised products and services.

Conventional websites such as those hosted on Orkut™, Friendster™, Tribe™, or other websites, allow users to form member networks. The member networks on conventional websites allow members of each member network to communicate with each other and list announcements associated with the member network. Generally, a conventional member network does not have provisions allowing its members to create and effectively target advertisement to other network members.

SUMMARY OF THE INVENTION

Embodiments of the present invention provide methods and systems for member-created advertisement in a member network. In one embodiment of the present invention, there is provided a method comprising: receiving a request to create an advertisement from a first user, wherein the first user is from a network of associated users; receiving advertisement content for the advertisement; receiving a selection of a category of one or more users from the network of associated users as a target for the advertisement, wherein the category of one or more users comprises at least a second user; generating the advertisement based on the advertisement content; and providing the advertisement to at least the second user.

The aforementioned embodiment is mentioned not to limit or define the invention, but to provide an example of embodiments of the invention to aid understanding thereof. Such exemplary embodiment is discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures.

DETAILED DESCRIPTION

Introduction

Embodiments of the present invention provide methods and systems for creating and disseminating member-created advertisements in a member network to better target advertisement audience within the member network. There are multiple embodiments of the present invention. By way of introduction and example, in one exemplary embodiment of the present invention, the method begins with a member network site receiving a request from one of its members to create and disseminate advertisements to other members in the member network. In response, the member network site provides the requesting member with means to create the advertisement, including options to choose in creating an advertisement for a particular category and field entries for the requesting member to input advertisement content. The member network site also allows the requesting member to choose the advertisement audience based on the member's profile within the member network, particularly, the member's association and/or nexus with other members in the network as can be gathered from the member's profile. The created advertisement is then presented to the chosen advertisement audience via advertisement displays within or separate from each member profile of the chosen advertisement audience, or via advertisement displays in e-mails to the chosen advertisement audience.

This introduction is given to introduce the reader to the general subject matter of the application. By no means is the invention limited to such subject matter. Exemplary embodiments are described below.

System Architecture

Figure 1:
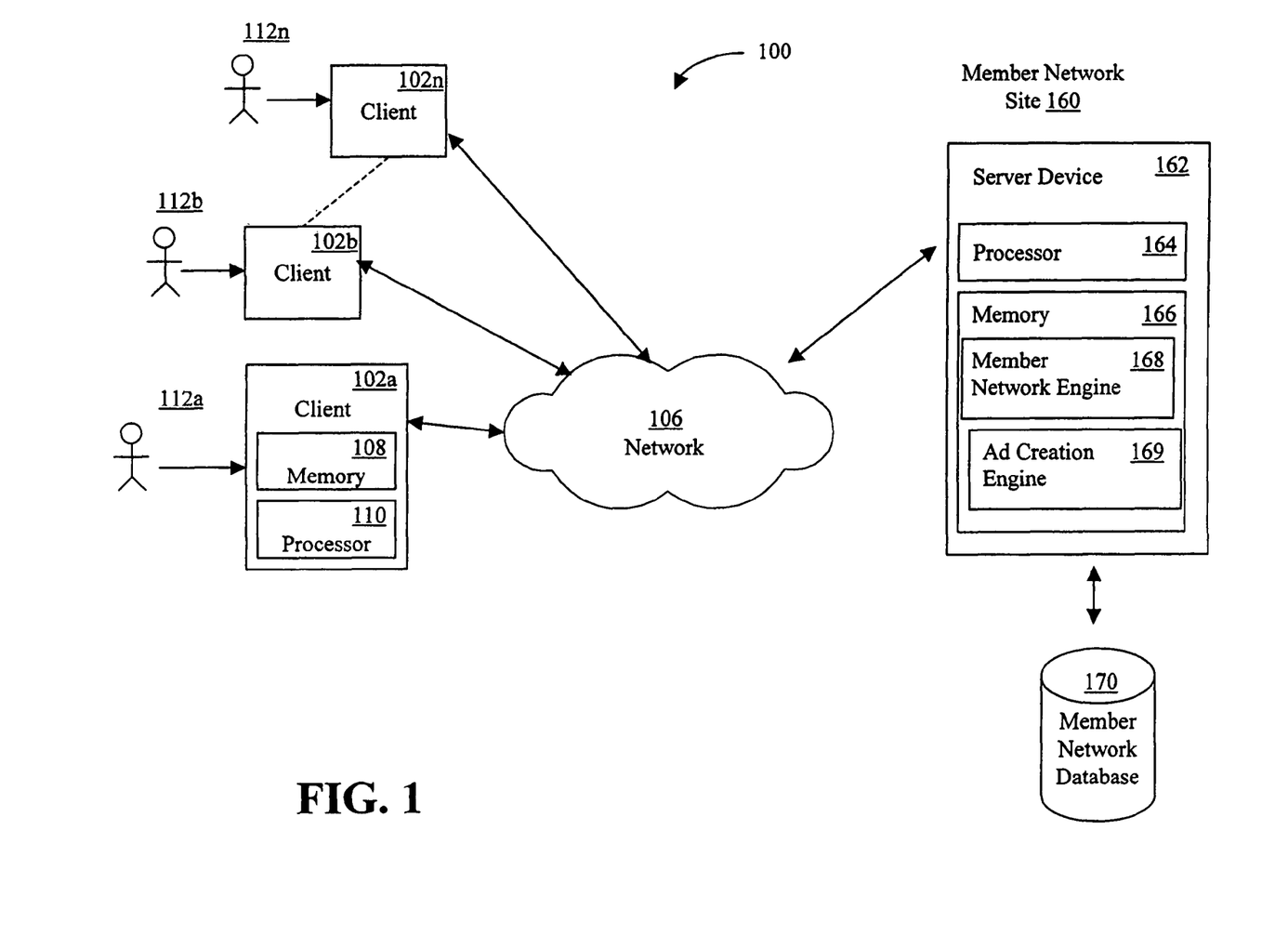
FIG. 1 is a block diagram illustrating an exemplary environment in which embodiments of the present invention may operate.

Various systems in accordance with the present invention may be constructed. FIG. 1 is a block diagram illustrating an exemplary system in which embodiments of the present invention can operate. The present invention may operate, and be embodied, in other systems as well.

Referring now to the drawings in which like numerals indicate like elements throughout the several figures, FIG. 1 is a block diagram illustrating an exemplary system in accordance with an exemplary embodiment of the present invention. The system 100 shown in FIG. 1 includes multiple client devices 102*a-n* with users 112*a*-112*n* in communication with a member network site 160 over a network 106. The network 106 can be a wired or wireless network. Further, it can be a public network, e.g., the Internet, or a private data network, e.g., a local area network (LAN) or a wide area network (WAN). Moreover, methods according to the present invention may operate within a single computer.

Each of the client devices 102a-n includes a memory 108, which can be a computer-readable medium (CRM), such as a random access memory (RAM), coupled to a processor 110. The processor 110 executes computer-executable program instructions stored in the client device, such as memory 108, as program code. Such processor may include a microprocessor, an ASIC, and state machines. Such processors include, or may be in communication with, media, for example computer-readable media, which stores instructions that, when executed by the processor, cause the processor to perform the methods described herein. Moreover, the processor 110 can be any of a number of computer processors, such as processors from Intel Corporation of Santa Clara, Calif. and Motorola Corporation of Schaumburg, Ill.

Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may include code from any suitable computer-programming language, including, for example, C, C++, C#, Visual Basic, Java, Python, Perl, and JavaScript.

Client devices 102a-n can also include a number of external or internal devices such as a mouse, a CD-ROM drive, a DVD drive, a keyboard, a display, or other input or output devices. Examples of client devices 102a-n are personal computers, digital assistants, personal digital assistants (PDAs), cellular phones, mobile phones, smart phones, pagers, digital tablets, laptop computers, Internet appliances, and other processor-based devices. In general, the client devices 102a-n can be any type of processor-based platform that operates on any operating system capable of supporting one or more client application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other sites, systems and devices coupled to the network 106. As shown in FIG. 1, a member network site 160 is also coupled to the network 106.

The member network site 160 shown includes a member network database 170 and a server device 162 executing a member network engine application program, also known as a member network engine 168. The member network engine 168 allows users, such as user 112a, to interact with and participate in a member network. A member network can refer to a network connecting entities, such as people or organizations, by a set of relationships, such as social relationships like friendship, co-working, or information exchange. Of course, a member network can refer to a computer application or data connecting such entities by such social relationships. Examples of member networks include Orkut.com and Friendster.com.

Member networks can comprise any of a variety of suitable arrangements. An entity or member of a member network can have a profile and that profile can represent the member in the member network. The member network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the member network engine 168 can determine the type of association between member profiles, including, in some embodiments, the degree of separation of the association and the corresponding weight or level of the association.

Similar to the client devices 102a-n, the server device 162 shown includes a processor 164 coupled to a CRM 166. The server device 162 is in communication with a member network database 170. Server device 162, depicted as a single computer system, may be implemented as a network of computer processors. Examples of the server device 162 are servers, mainframe computers, networked computers, a processor-based device, and similar types of systems and devices. The server processor 164 can be any of a number of suitable computer processors, such as processors from Intel Corporation of Santa Clara, Calif. and Motorola Corporation of Schaumburg, Ill.

Memory 166 in the server device 162 contains a member network engine application program, also known as a member network engine 168. A member network can include profiles that can be associated with other profiles. Each profile may represent a member and a member can be, for example, a person, an organization, a business, a corporation, a community, a fictitious person, or other entity. Each profile can contain entries, and each entry can include information associated with a profile. Examples of entries for a person profile can include information regarding relationship status, birth date, age, children, ethnicity, religion, political view, sense of humor, sexual orientation, fashion preferences, smoking habits, drinking habits, pets, hometown location, passions, sports, activities, favorite books, music, television, or movie preferences, favorite cuisines, email addresses, location information, IM name, phone number, address, skills, career, or any other information describing, identifying, or otherwise associated with a profile. Entries for a business profile can include market sector, customer base, location, supplier information, net profits, net worth, number of employees, stock performance, or other types of information associated with the business profile.

Additionally, entries within a profile can include associations with other profiles. Associations between profiles within a member network can include, for example, friendships, business relationships, acquaintances, community or group associations, activity partner associations, common interest associations, common characteristic associations, or any other suitable type of relationship connection (e.g., social relationship connection). Members can set up new associations or join existing associations in the member network as desired. For example, a member can set up a "Computer Science community" for those members who are interested or work in the computer science field. Likewise, a member can join an existing "Baseball community" if the member is interested in baseball and/or sport in general. Associations between profiles can also have various levels. For example, friendship levels can include, for example, a "haven't met" level, an "acquaintance" level, a "friend" level, a "good friend" level, a "best friend" level, and other suitable levels.

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two (2) between profiles A and C. A degree of separation can be type-specific or type-neutral. Type specific degrees of separation only count relationships of a certain type. Thus, for example, in the case above where A is a friend of B, and B is a friend of C, there is a friendship degree separation of two, even if A is directly associated with C by a business association, which would otherwise produce a degree of type-neutral separation of one (1).

Member 166 also contains an advertisement-creation application program, also known as an advertisement-creation engine 169, that allows members of the member network to create and disseminate advertisements to other members in the member network. In operation, the member network engine 162 receives a request to create an advertisement from a user, such as user 112a, as entered to a corresponding client device, such as client device 102a. The request is sent to the advertisement-creation engine 169, which then requests advertisement content from the user 112a in order to create the advertisement. The advertisement-creation engine 169 also interacts with the member network engine 168 to retrieve the user's 112a member profile from a member network database 170 (which is further described below), present user 112a with associations and/or nexuses between the user 112a and other members in the member network based on the member profile for selection of advertisement audience, and receive the selected advertisement audience from the user 112a. The member network engine 169 can then create the advertisement based on advertisement content input by the user 112a and provide the advertisement to the selected advertisement audience also based on an audience selection by the user 112a.

Server device 162 also provides access to storage elements, such as a member network storage element, in the example shown in FIG. 1, a member network database 170. The member network database 170 can be used to store profiles of members in a member network and to store communities within the member network as created by the member-network engine 168. Data storage elements may include any one or combination of methods for storing data, including without limitation, arrays, hash tables, lists, and pairs. Other similar types of data storage devices can be accessed by the server device 162. The member network engine 168 can receive data comprising the profiles and created associations from the member-network database 170 and can also send data comprising created associations and profiles to the member network database 170 for storage. The member-network database 170 may be physically attached or otherwise in communication with the member-network engine 168 by way of a network or other connection.

It should be noted that the present invention may include systems having different architecture than that which is shown in FIG. 1. For example, in some systems according to the present invention, server device 162 may include a single physical or logical server. The system 100 shown in FIG. 1 is merely exemplary, and is used to help explain the member networks and methods illustrated in subsequent figures.

Exemplary Member Network

Figure 2:
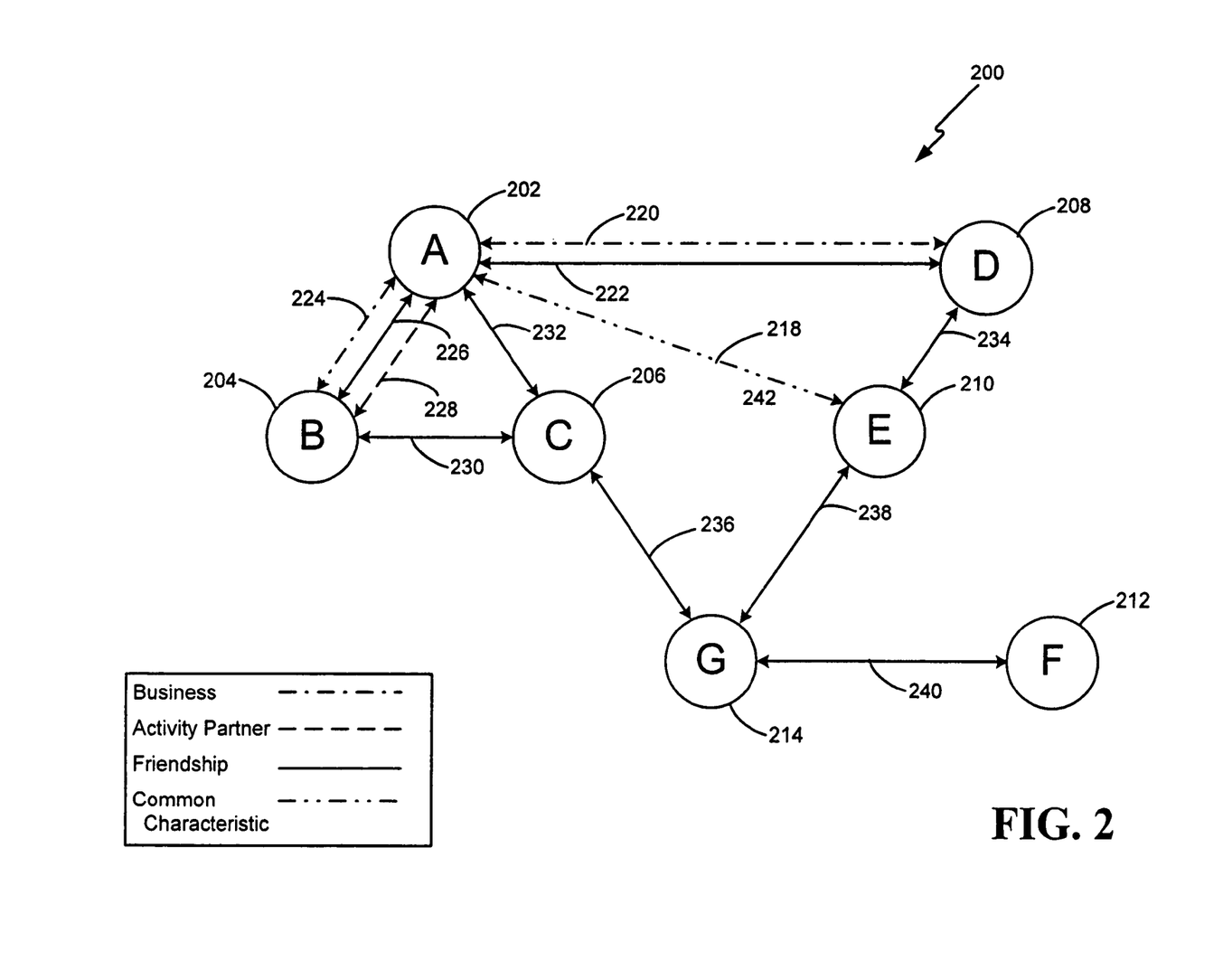
FIG. 2 depicts a diagram of a member network in accordance with an embodiment of the present invention.

FIG. 2 shows a diagram of a member network 200 according to one embodiment of the present invention. According to the embodiment illustrated in FIG. 2, the member network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the member network 200. The exemplary network 200 shown in FIG. 2 has seven associated users or members. Considerably more members can be part of the member network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, television, or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the member network 200 in specific categories, such as humor, intelligence, fashion, trustworthiness, sexiness, and coolness. A member's category ratings can be contained in the member's profile. In one embodiment of the member network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the member network, such as the frequency that the member logs in to the member network and the member's most recent login to the member network. Membership information can also include information about the rate and frequency that a member profile gains associations to other member profiles. In a member network that comprises advertising or sponsorship, a member profile may contain consumer information.

Consumer information may include: the frequency, patterns, types, or number of purchases the member makes; information about which advertisers or sponsors the member has accessed, patronized, or used; and/or information about a member's behavior, e.g., areas of the member network and/or other articles that the member previously accessed and viewed.

A member profile may comprise data stored in memory. The profile, in addition to comprising data about the member, can also comprise data relating to others. For example, a member profile can contain an identification of associations or virtual links with other member profiles. In one embodiment, a member profile includes an identification of association(s) to which the member belongs. For example, a member profile can indicate that the member belongs to the Computer Science community. Moreover, membership information can include a classification of the member based on the member's various associations. For example, the member can be classified as a "sports fan" because the member belongs to the Baseball community. In another embodiment, a member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a member network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles of members. According to the embodiment shown in FIG. 2, the member network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the member network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in member network 200. For example, communities, special interest groups, organizations, political parties, universities, and legal persons, such as corporations and business partnerships may be members of the member network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a member network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Process

Various methods or processes in accordance with the present invention may be constructed. For example, in one embodiment, the method begins with a member network site receiving a request to create an advertisement from one of the members (hereinafter, "first member") of a member network. Next, the member network site also receives advertisement content for the advertisement to be created. The received advertisement content can include advertisement content that is specific to a category selection for the advertisement. The advertisement content can be received as input from a predetermined field of entry, wherein text and/or graphic content can be entered or imported.

The first member further provides the member network site with a targeted member or members (hereinafter, "second member(s)") in the member network to whom the advertisement is intended. Consequently, the member network site generates the advertisement, based on the advertisement content, and provides the advertisement to the second member(s). The advertisement can be displayed within or separate from a profile of the second member(s); for the later, a link to the advertisement can be provided from within the second member(s)' profile. The advertisement can also be sent via e-mail to the second member(s). Further, the advertisement can be provided to the second member(s) based on a category selection for viewing by the second member(s), a selection of an association between the first member and the second member(s), or in general a profile of the first user as maintained by the network. The member network engine can also charge a fee to the first user for enabling the first user to create and disseminate the advertisement to the second member(s).

Figure 3:
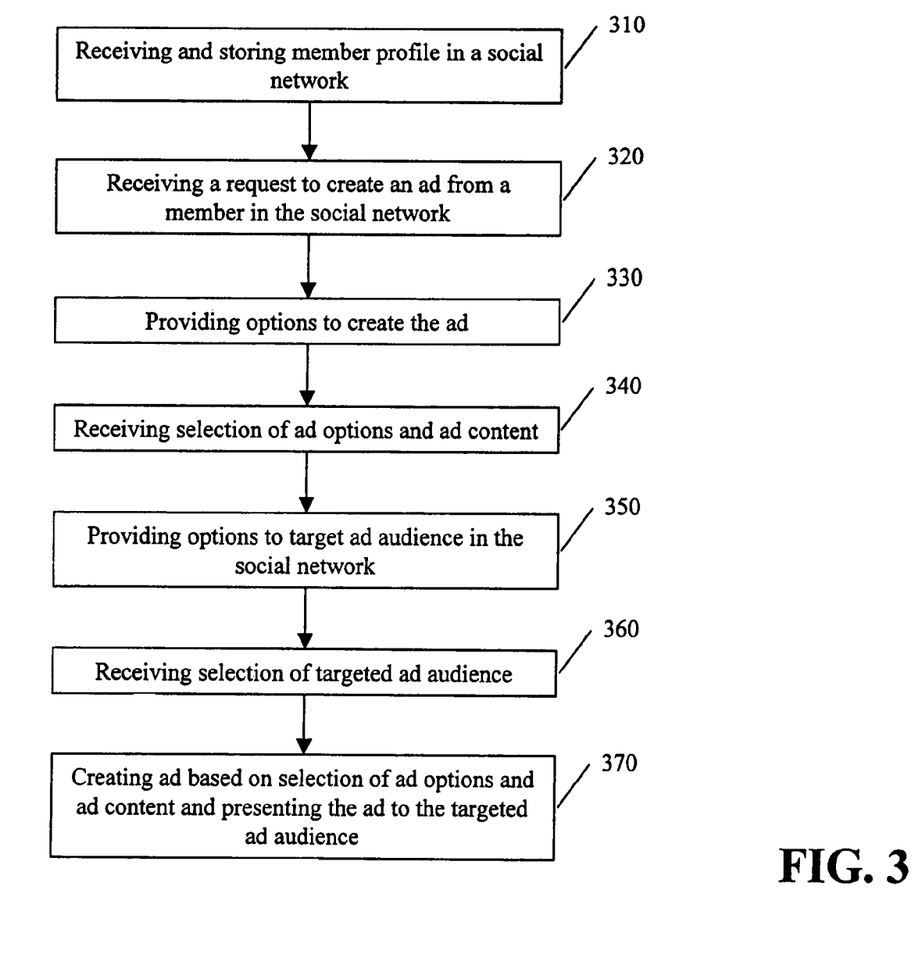
FIG. 3 depicts a process flow for members in a member network to create and disseminate advertisements to targeted member(s) within the network in accordance with an embodiment of the present invention.

FIG. 3 illustrates an exemplary method that enable members in a member network to create and disseminate advertisements to targeted member(s) within the network. The exemplary method is provided by way of example, as there are a variety of ways to carry out methods according to the present invention. The method shown in FIG. 3 can be executed or otherwise performed by one or a combination of various systems. The method in FIG. 3 is described below as carried out by the system 100 shown in FIG. 1 by way of example, and various elements of the system 100 are referenced in explaining the example method of FIG. 3.

Figure 4:
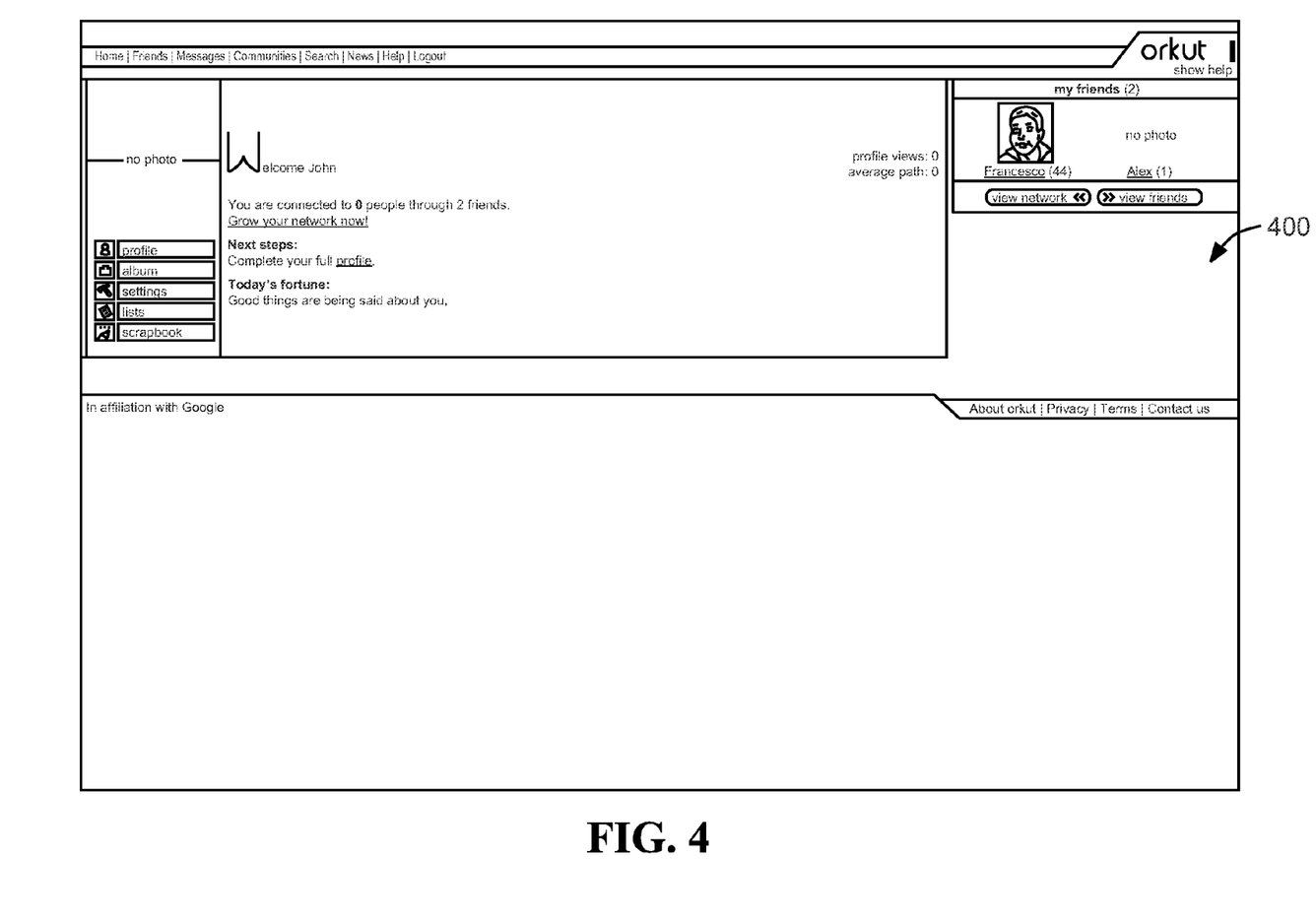
FIG. 4 depicts a sample screenshot of a home page of a member profile in a member network in accordance with an embodiment of the present invention.

Referring to the method depicted in FIG. 3, with further reference to the sample screenshot shown in FIG. 4, wherein a member in a member network can create and disseminate advertisements to other members in the same member network. The method begins at 310 with a user, such as user 112a, joining a member network, such as the member network 200 (e.g., Orkut™), by creating a user or member profile, as described earlier. The created member profile is received and stored in the member network database 170 (or any other suitable storage device).

At 320, as a member of the member network, the user 112a can access his or her member profile, a home page 400 of which is shown in FIG. 4 as an example, and create advertisements for dissemination to other members in the member network. In one embodiment, the user 112a has an option to create one or more advertisements, whereby such option can be presented to the user 112a on the home page 400 (not shown) or anywhere within the user's 112a member profile for selection.

At 330, once the user 112a selects to create one or more advertisements, the user 112a is presented with further options to create each advertisement and input advertisement content. In one embodiment, one of the options is a category selection for each advertisement. Examples of advertisement categories include, but are not limited to: help-wanted advertisements, job-seeking advertisements, personal advertisements, product advertisements, and service advertisements. The advertisement categories are predetermined as desired by, e.g., the administrator of the member network or any entity authorized to do so. In one embodiment, the user 112a can create new categories.

Once the user 112a selects a category for his/her advertisement, the user 112a is presented with one or more fields of entry specific to the selected advertisement category for input, wherein the user 112a can enter the desired content for his/her advertisement. For example, a help-wanted advertisement can include, among other fields: a position field for the user 112a to input the position of employment available, such as a clerk, a chef, an IT professional; a location field for the user 112a to input a location, such as a store, an address, or a locality, where the input position is available; a work experience field for the user 112a to input the desired or required experience for the available position. Alternatively, upon selection of a category, the user 112a can be presented with a blank page wherein the user 112a can input advertising text and/or graphics for the advertisement content. The user 112a can input such advertisement content directly or import them from other files and/or databases. Still alternatively, upon selection of a category, the user 112a can be presented with one or more fields of entry and blank areas where the user 112a can input additional text and/or graphics for the advertisement content.

At 340, the advertisement-creation engine 169 receives the selected advertisement options and advertisement content provided by the user 112a. At 350, the advertisement-creation engine 169 provides the user 11a with options to target a particular audience, i.e., one or more other members in the member network 200. In one embodiment, the advertisement-creation engine 169 can interact with the member network engine 168 to retrieve the user's 112a member profile from the member network database 170, generate a list of all associations and/or nexuses between the user's 112a and other members in the member network 200, and provide such list to the user 112a so that the user 112a can target individual member(s) and/or group(s) of individual members that are associated with or have a nexus with the user 112a. For example, the user 112a may be provided with a pull-down menu for selecting the targeted audience, wherein the menu includes the aforementioned list. Examples of possible selections in the list include:

- A particular level of association; for example, all best friends of the user 112a, all good friends of the user 112a, all acquaintances of the user 112a, all best business associates of the user 112a, all good business associates of the user 112a, or one or more of the aforementioned groups.
- A particular degree of association; for example, one degree of friendship association with the user 112a, three-degrees of business associations with the user 112a, two degrees of community association with the user 112a, or one or more of the aforementioned groups.
- Particular community, communities, association, or associations available within the member network, wherein the user 112a may or may not belong to such community, communities, association, or associations; for example, the user 112a can send computer-sale advertisements to every member in the "Computer Science community," to which the user 112a belongs or with which the user 112a is affiliated, or to every member that has a friendship association with the user 112a (regardless of the level or degree of such friendship association).
- Particular entries in the user's 112a member profile; for example, personal information, business information, contact information, hobby information, and educational information.

Figure 5:
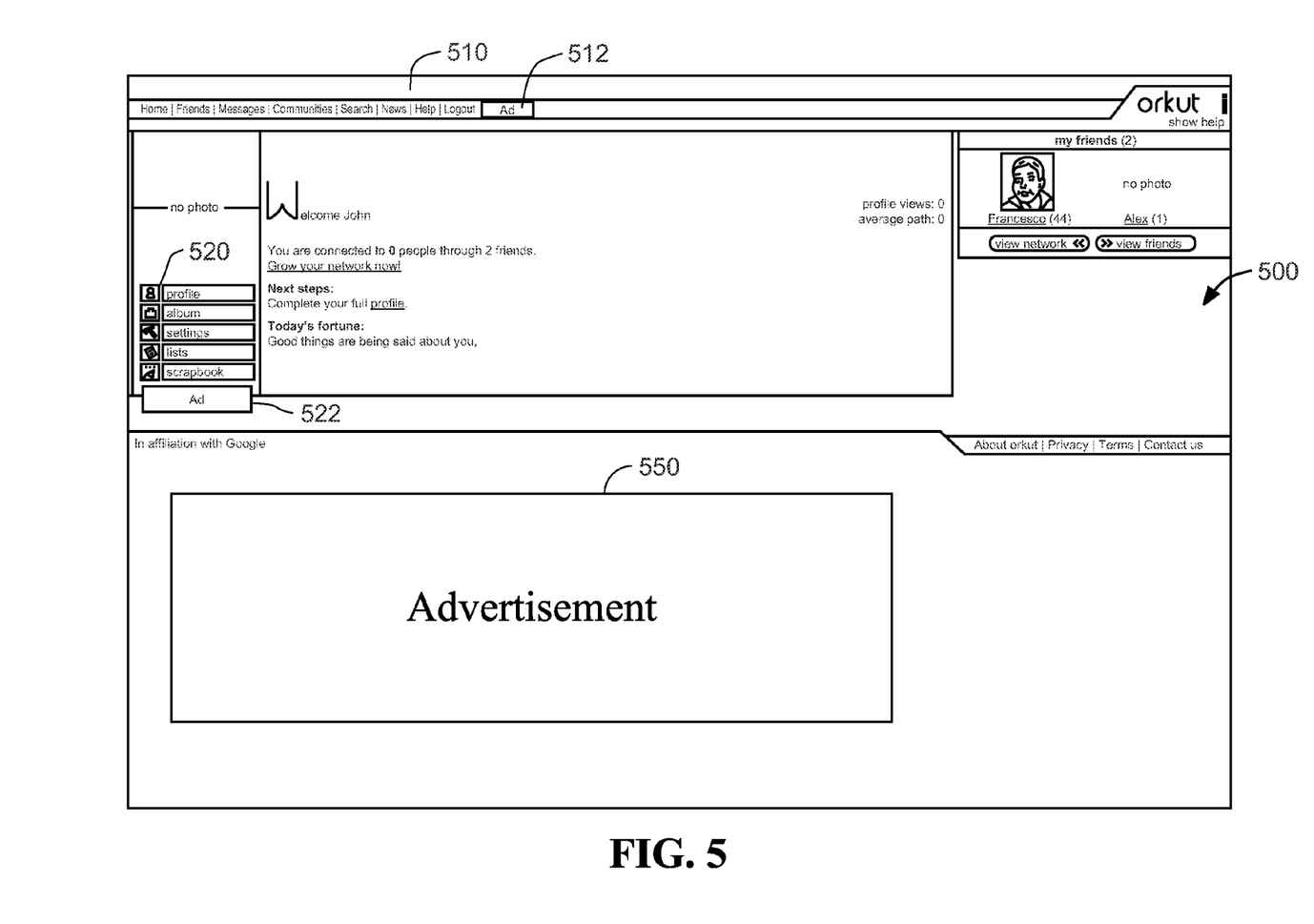
FIG. 5 depicts a sample screenshot of a home page of a member profile in a member network, wherein an advertisement is displayed, in accordance with an embodiment of the present invention.

At 360, once the user 112a has targeted an advertisement to a particular audience, e.g., individual member(s) and/or group(s) of members in the member network 200, the advertisement-creation engine 169 receives the advertisement audience selection from the user 112a. At 370, the advertisement-creation engine 169 creates the advertisement based on the selected advertisement options and advertisement content received at 340 and presents the advertisement to the targeted audience. In one embodiment, the advertisement can be displayed on the home page or landing page of each targeted member. FIG. 5 depicts a home page 500 with a displayed advertisement 550. Thus, every time a targeted member logs into the member network 200 or accesses his/her member profile in the member network 200, such targeted member is initially presented with the home page 500 having the displayed advertisement 550.

As also depicted in FIG. 4, the targeted member can access other pages of his/her profiles using various available tabs 410. Likewise, the targeted member can access other pages for personal settings at links 420. Thus, in another embodiment of the present invention, the advertisement can be displayed on another available page or on all available pages, such as those pages available through tabs 410 and/or links 420, of the targeted member profile. For example, FIG. 6 shows an advertisement 650 that can be displayed in the communities page 600 of the targeted member as accessible from the communities tab at 510 in FIG. 5.

In still another embodiment, an "Advertisement" tab 512 can be in the menu bar, or an "Advertisement" link 522 can be included with other navigational links, to organize in one place within the member profile all advertisements that are sent and displayed to the targeted member. While FIG. 5 illustrates both an Advertisement tab 512 and an Advertisement link 522, it will be understood that either an Advertisement tab 512 or an Advertisement link 522 or both can be used. In a further embodiment, an advertisement area outside of or separate from a member profile, such as an advertisement bulletin board or web site, can be set up within the member network 200 to display advertisements posted by members of the member network 200. The targeted member then can be provided with a link to such area from a tab 510 or a link 520 in the member profile, whereby the targeted member can be directed to, for example, a web page of advertisements specifically targeted to such member. In yet another embodiment, the advertisement can be displayed in an e-mail and sent to the targeted member.

No matter where or to whom the advertisements are displayed, each member in the member network 200 has options to filter incoming advertisements for viewing based on desired categories and criteria for each category, just as an advertisement creator is able to create an advertisement for a particular category with particular criteria as described earlier. In one embodiment, a member can filter advertisements based on any associations possible within the member network or information entered in the member profile, such as: a particular level of association; a particular degree of association; particular community, communities, association, or associations available within the member network; and particular entries in the member profile. For example, the user 112a, as a member of the member network 200, can also receive advertisements from other network members, wherein the user 112a can be provided with a pull-down menu (or other known means for selection) to filter incoming advertisements so as to view only those advertisements from a particular association (e.g., a friendship or business association); from a particular level or degree of a particular association (e.g., a best-friend association or a two-degree of business association); from a "baseball community" to which the user 112a belongs, in which the user 112a is interested, or with which the user 112a is affiliated in some way (e.g., one of the user's 112a listed hobby in his/her member profile is baseball).

Figure 6:
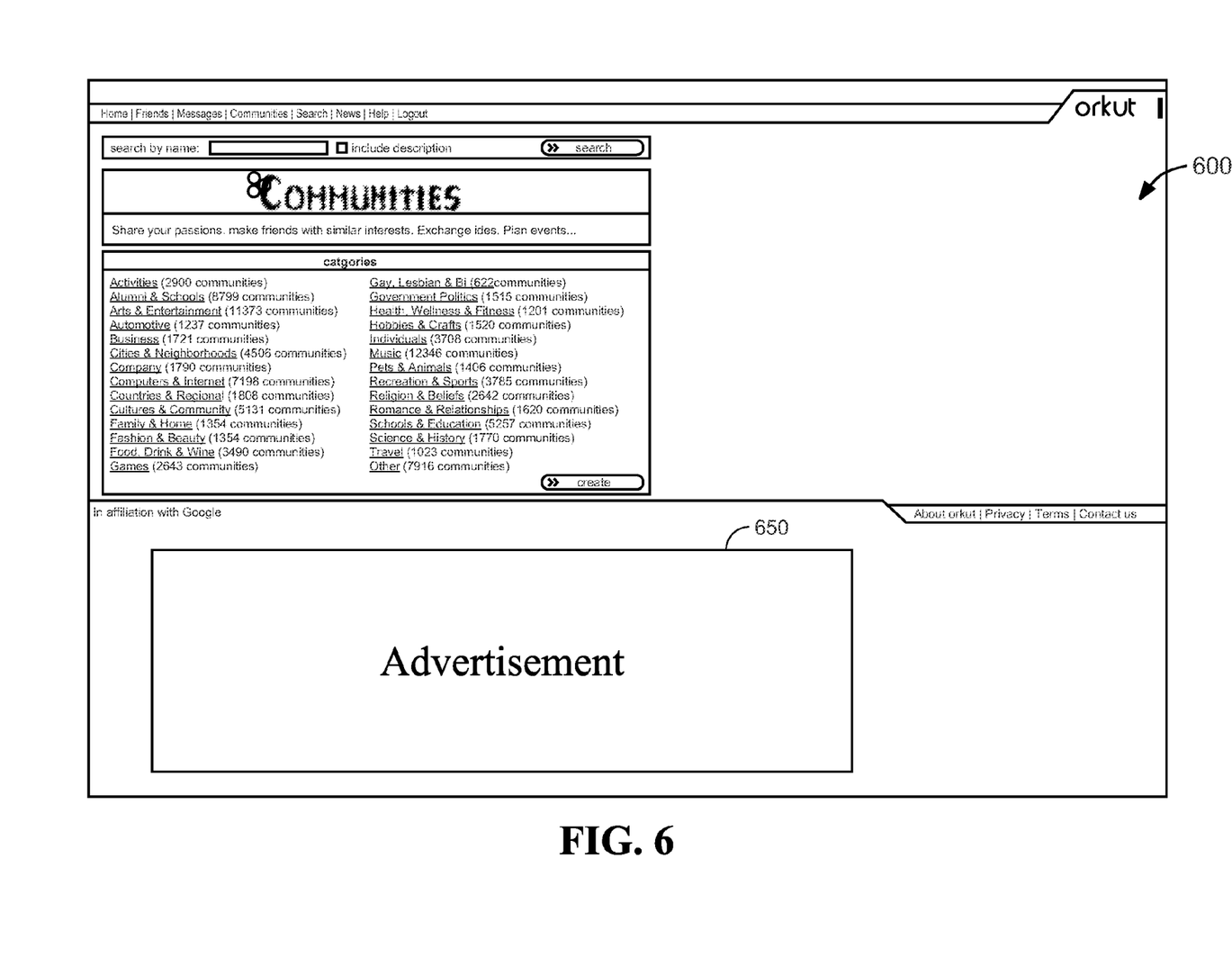
FIG. 6 depicts a sample screenshot of communities page of a member profile in a member network, wherein an advertisement is displayed, in accordance with an embodiment of the present invention.

Also, no matter where or to whom the advertisements are displayed, each advertisement, such as the advertisement 550 in FIG. 5 or advertisement 650 in FIG. 6, can include a picture or any other form of identification identifying the sender of the advertisement. Each advertisement can also include a link to the sender's member profile, sender's e-mail address, or any other sender's information. Each advertisement can also include a link to the sender's web site or a more detailed advertisement page to further elaborate on the advertisement. The identification of the advertisement sender can help prevent advertisement spamming. For example, a member that receives an advertisement can identify the sender to determine whether the member knows the sender. If the member believes that the he/she has been spammed with an advertisement, the member can report the advertisement spamming to the administrator of the member network 200 and/or sever the underlying relationship or association with the advertisement sender that allows such advertisement to be sent. For example, if the member has a friendship connection with the advertisement sender, the member can sever such friendship connection, by directly removing the sender's name from the friendship list in the member profile in the case of one-degree of friendship or asking another friend to remove the sender's name from the friend's friendship list in the case of two or more degrees of friendship (alternatively, severing the friendship association with the another friend).

According to one embodiment of the present invention, member-created advertisements can provide financial opportunities to member network sites that provide for such advertisements. For example, a member network site can charge an advertisement sender on a click-through basis (e.g., a flat fee for each click-through of a displayed advertisement), a current-use basis (e.g., a flat fee based on the number of members to which an advertisement is sent), or any other basis known or will be known in the art.

Accordingly, member-created advertisement of the present invention enable members of a member network to create and effectively target advertisement to other network members and enhance the display of such advertisement in a more obvious manner to attract the viewing of such advertisement by targeted members.

General

Although the invention has been described with reference to these embodiments, other embodiments could be made by those in the art to achieve the same or similar results. Variations and modifications of the present invention will be apparent to one skilled in the art based on the present disclosure, and the present invention encompasses all such modifications and equivalents.

The invention claimed is:

1. A method comprising:
    receiving, by one or more processors, a request to generate a user-created advertisement from a first user, wherein the first user is a member of a member network of associated users and the first user is associated with a first page in the member network;
    receiving, by the one or more processors, advertisement content for the user-created advertisement that is associated with the request from the first user, the advertisement content comprising at least one of the first user's composed text and the first user's imported graphics;
    receiving, by the one or more processors, a target audience from the first user for the user-created advertisement, the target audience comprising one or more users from the network that have a relationship with the first user in the member network, the relationship comprising at least one of a particular degree of association with the first user in the member network and a particular level of association with the first user in the member network;
    generating, by the one or more processors, the user-created advertisement based on the advertisement content received from the first user;
    receiving, from at least one user of the member network from the target audience, a category selection that describes the advertisement content of the user-created advertisement; and
    providing, by the one or more processors, information including the user-created advertisement for display within at least one second page of the at least one user of the member network from the target audience in response to receiving the category selection from the at least one of the member network from the target audience and receiving the target audience from the first user that has a relation with the target audience.

2. The method of claim 1, wherein the at least one second page includes a home page or a communities page associated with one of the target audience.

3. The method of claim 1, wherein receiving, by the one or more processors, advertisement content for the user-created advertisement that is associated with the request from the first user comprises:
    receiving, from the first user, a selection of a category for the user-created advertisement; and
    receiving, from the first user, advertisement content that is specific to the selection of the category.

4. The method of claim 3, wherein the receiving, from the first user, advertisement content that is specific to the selection of the category comprises:
    receiving, from the first user, the specific advertisement content from an input to at least one predetermined field of entry.

5. The method of claim 1, wherein receiving, by the one or more processors, the target audience from the first user for the user-created advertisement, the target audience comprising one or more users from the member network comprises receiving, from the first user, a selection of the target audience from a predetermined group of users from the member network of associated users, wherein the predetermined group of users have a predetermined type of relationship with the first user.

6. The method of claim 1, wherein the at least one second page includes an advertisement tab or an advertisement link.

7. The method of claim 1, further comprising:
    providing a link to the user-created advertisement within the at least one second page of the at least one user of the member network from the target audience.

8. The method of claim 1, further comprising providing an e-mail including the user-created advertisement to at least one user of the member network from the target audience.

9. The method of claim 1, wherein the user-created advertisement further includes at least one of a picture and an identification of the first user.

10. The method of claim 1, further comprising:
    receiving, from the first user, a selection of at least one of the particular degree of association and the particular level of association of the first user to the target audience; and
    providing the information including the user-created advertisement for display within the at least one second page of the at least one user from the target audience based on the selection of the at least one of the particular degree of association and the particular level of association.

11. The method of claim 1, wherein receiving, by the one or more processors, the target audience for the user-created advertisement further comprises receiving a selection of a particular community associated with the first user in the member network.

12. The method of claim 1, further comprising:
    charging a fee to the first user for the providing information including the user-created advertisement for display within the at least one second page of the at least one user from the target audience.

13. A non-transitory computer-readable storage medium on which is encoded executable program code, the executable program code when executed causing a computer to perform the steps comprising:
    receiving a request to generate a user-created advertisement from a first user, wherein the first user is a member of a member network of associated users and the first user is associated with a first page in the member network;
    receiving advertisement content for the user-created advertisement that is associated with the request from the first user, the advertisement content comprising at least one of the first user's composed text and the first user's imported graphics;
    receiving a target audience from the first user for the user-created advertisement, the target audience comprising one or more users from the member network that have a relationship with the first user in the member network, the relationship comprising at least one of a particular degree of association with the first user in the member network and a particular level of association with the first user in the member network;

generating the user-created advertisement based on the advertisement content received from the first user;

receiving, from at least one user of the member network from the target audience, a category selection that describes the advertisement content of the user-created advertisement; and providing information including the user-created advertisement for display within at least one second page of the at least one user of the member network from the target audience in response to receiving the category selection from the at least one user of the member network from the target audience and receiving the target audience from the first user that has a relationship with the target audience.

14. The non-transitory computer-readable medium of claim 13, wherein the at least one second page includes a home page or a communities page associated with one of the target audience.

15. The computer-readable medium of claim 13, wherein the program code is further configured to perform the steps of receiving, from the first user, a selection of a category for the user-created advertisement; and receiving, from the first user, advertisement content that is specific to the selection of the category.

16. The non-transitory computer-readable medium of claim 15, wherein receiving, from the first user, advertisement content that is specific to the selection of the category further comprises program code for receiving, from the first user, the advertisement that is specific content from an input to at least one predetermined field of entry.

17. The non-transitory computer-readable medium of claim 13, wherein receiving the target from the first user for the user-created advertisement, the target audience comprising one or more users from the member network comprises receiving, from the first user, a selection of the target audience from a predetermined group of users from the member network of associated users, wherein the predetermined group of users have a predetermined type of relationship with the first user.

18. The non-transitory computer-readable medium of claim 13, wherein the at least one second page includes an advertisement tab or an advertisement link.

19. The non-transitory computer-readable medium of claim 13, wherein the program code is further configured to perform the step of:

providing a link to the user-created advertisement within the at least one second page of at the least one user of the member network from the target audience.

20. The non-transitory computer-readable medium of claim 13, wherein the program code is further configured to perform the step of:

providing an e-mail including the user-created advertisement to the at least one user of the member network from the target audience.

21. The non-transitory computer-readable medium of claim 13, wherein the user-created advertisement further includes at least one of a picture and an identification of the first user.

22. The non-transitory computer-readable medium of claim 13, wherein the program code is further configured to perform the steps of:

receiving, from the first user, a selection of at least one of the particular degree of association and the particular level of an association of the first user to the target audience; and providing the information including the user-created advertisement for display within the at least one second page of the at least one user from the target audience based on the selection of the at least one of the particular degree of association and the particular level of association.

23. The non-transitory computer-readable medium of claim 13, wherein receiving the target audience for the user-created advertisement further comprises receiving a selection of a particular community associated with the first user in the member network.

24. The non-transitory computer-readable medium of claim 13, wherein the program code is further configured to perform the step of:

charging a fee to the first user for generating the user-created advertisement.

25. The non-transitory computer-readable medium of claim 13, wherein the program code is further configured to perform the step of:

charging a fee to the first user for providing the information including the user-created advertisement for display within the at least one second page of the at least one user from the target audience.

26. The method of claim 1, wherein the degree of association is a type-specific degree of association.

27. The method of claim 1, wherein the degree of association is a level-specific degree of association.

28. The method of claim 1, wherein the relationship comprises a friendship relationship.

29. The method of claim 1, wherein the relationship comprises a business relationship.

30. The method of claim 1, wherein the relationship comprises a family relationship.

31. The method of claim 1, wherein the first user and the one or more users from the target audience are bi-directionally associated with each other in the member network.

* * * * *